United States Patent
Aoki et al.

(10) Patent No.: US 12,371,591 B2
(45) Date of Patent: Jul. 29, 2025

(54) ELECTRICALLY PEELABLE ADHESIVE COMPOSITION, ELECTRICALLY PEELABLE ADHESIVE PRODUCT, AND METHOD FOR PEELING PRODUCT

(71) Applicant: VIGteQnos co., ltd., Gose (JP)

(72) Inventors: Takahiro Aoki, Gose (JP); Takashi Tomoda, Gose (JP)

(73) Assignee: VIGTEQNOS CO., LTD., Gose (JP)

( * ) Notice: Subject to any disclaimer, the term of this patent is extended or adjusted under 35 U.S.C. 154(b) by 740 days.

(21) Appl. No.: 17/602,212

(22) PCT Filed: Feb. 12, 2021

(86) PCT No.: PCT/JP2021/005265
§ 371 (c)(1),
(2) Date: Oct. 7, 2021

(87) PCT Pub. No.: WO2021/166803
PCT Pub. Date: Aug. 26, 2021

(65) Prior Publication Data
US 2022/0195259 A1    Jun. 23, 2022

(30) Foreign Application Priority Data
Feb. 18, 2020    (JP) ................. 2020-025563

(51) Int. Cl.
*C09J 7/38*    (2018.01)
(52) U.S. Cl.
CPC .................. *C09J 7/385* (2018.01)
(58) Field of Classification Search
CPC ..................................... C09J 7/385
See application file for complete search history.

(56) References Cited

U.S. PATENT DOCUMENTS

| | | | | |
|---|---|---|---|---|
| 8,901,348 | B2 * | 12/2014 | Sakaguchi | B01J 23/42 562/538 |
| 2016/0009960 | A1 | 1/2016 | Yamada et al. | |
| 2017/0355892 | A1 * | 12/2017 | Heucher | C09J 175/02 |
| 2018/0305593 | A1 | 10/2018 | Akamatsu et al. | |
| 2021/0277286 | A1 * | 9/2021 | Mizobata | C09J 7/10 |

FOREIGN PATENT DOCUMENTS

| | | |
|---|---|---|
| EP | 3848434 A1 | 7/2021 |
| JP | 2010-001360 * | 1/2010 |
| JP | 2010-001360 A | 1/2010 |
| JP | 2010-037354 A | 2/2010 |
| JP | 2010-037355 A | 2/2010 |
| JP | 2010-095675 A | 4/2010 |
| JP | 2018-513225 A | 5/2018 |
| JP | 2020-164778 A | 10/2020 |
| WO | 2014/157406 A1 | 10/2014 |
| WO | 2017/064918 A1 | 4/2017 |

OTHER PUBLICATIONS

Fujihana JP,2010-095675,A (JPO transl.) (Year: 2010).*
Translation of JP 2010-001360 (Year: 2010).*

* cited by examiner

*Primary Examiner* — Robert C Boyle
(74) *Attorney, Agent, or Firm* — Stites & Harbison, PLLC; Jeffrey A. Haeberlin; Trevor T. Graves (57) ABSTRACT

The present invention has an object of obtaining an electrically peelable adhesive product that is strong in adhesibility when used, is excellent in peelability even though a low voltage is applied, and does not leave much adhesive deposit after being peeled. The present invention achieves the above object by virtue of an electrically peelable adhesive composition contained in the adhesive product, the adhesive composition comprising an acrylic polymer, an ionic liquid having an ionic conductivity of $10^{-4}$ S/cm or more to $10^{-2}$ S/cm or less, and an alkyl ether of a polyethylene glycol, and containing 5 parts by weight or more to 30 parts by weight or less of the ionic liquid and of the alkyl ether of the polyethylene glycol with respect to 100 parts by weight of the acrylic polymer.

12 Claims, 4 Drawing Sheets

ELECTRICALLY PEELABLE ADHESIVE COMPOSITION, ELECTRICALLY PEELABLE ADHESIVE PRODUCT, AND METHOD FOR PEELING PRODUCT

TECHNICAL FIELD

The present invention relates to an electrically peelable adhesive composition. The present invention also relates to an electrically peelable adhesive product. The present invention further relates to a method for peeling the product.

BACKGROUND ART

Adhesives and adhesive tapes having adhesion to an adherend and peelability from the adherend have been used for a variety of purposes (for example, surface protection films, masking tapes for painting, and peelable memo pads). Of these, the adhesive tapes generally comprise a base material and an adhesive layer placed thereon. This adhesive layer is required to have the adhesion in such a way that the adhesive layer cannot be peeled off from the adherend at time of transportation, stockpiling, or processing of the adherend, and also is required to have the peelability in such a way that the adhesive layer can be easily peeled off from the adherend after its purpose is accomplished.

As methods for peeling an adhesive from an adherend, physically peeling the adhesive is known, as well as peeling the adhesive by means of stimulation, such as light, heat, vibration, or electric current. For example, Japanese Unexamined Patent Application Publication No. 2010-037354 (PATENT LITERATURE 1) suggests a method for peeling an adhesive by means of electric current.

PATENT LITERATURE 1 also describes that the adhesive comprising a polymer and an ionic liquid can be provided that can be peeled off from an adherend by applying voltage thereto.

CITATION LIST

Patent Literature

PATENT LITERATURE 1: Japanese Unexamined Patent Application Publication No. 2010-037354

SUMMARY OF INVENTION

Technical Problems

It has been desired to develop electrically peelable adhesive products that are strong in adhesibility when used and excellent in peelability (low in adhesibility) even when low voltage, such as 30 V or less, is applied thereto, and do not leave any adhesive (namely, free of adhesive deposit) on adherends after the peeling of the adhesive products.

Solution to Problems

The present invention provides an electrically peelable adhesive composition containing an acrylic polymer, an ionic liquid having an ionic conductivity of $10^{-4}$ S/cm or more to $10^{-2}$ S/cm or less, and an alkyl ether of a polyethylene glycol, wherein an amount of the ionic liquid and an amount of the alkyl ether of the polyethylene glycol each is 5 parts by weight or more to 30 parts by weight or less with respect to 100 parts by weight of the acrylic polymer.

The present invention also provides an electrically peelable adhesive product including a base material and an electrically peelable adhesive layer formed in contact with the base material, wherein the electrically peelable adhesive layer contains the electrically peelable adhesive composition.

The present invention further provides an electrically peelable adhesive product including a core material and two electrically peelable adhesive layers formed in contact with both sides of the core material, respectively, wherein the electrically peelable adhesive layers contain the electrically peelable adhesive composition.

The present invention further provides a method for peeling the electrically peelable adhesive product, the method comprising: adhering the electrically peelable adhesive product to a conductive object in such a way that the electrically peelable adhesive layer comes in contact with the conductive object; applying a voltage of 30 V or less to the electrically peelable adhesive layer through the conductive object; and peeling off the electrically peelable adhesive product from the conductive object to which the adhesive product is directly adhered, wherein the conductive object is any of a conductive adherend, a conductive auxiliary material, and a conductive fixed object.

Advantageous Effects of Invention

The present invention provides a novel electrically peelable adhesive product that hardly leaves any adhesive deposit and is favorable to peelability.

DESCRIPTION OF EMBODIMENTS

Electrically Peelable Adhesive Composition

An electrically peelable adhesive composition in accordance with the present Embodiment (hereinafter also referred to simply as "adhesive composition") contains an acrylic polymer, an ionic liquid, and a migration accelerator.

Acrylic Polymer

The acrylic polymer in accordance with the present Embodiment can be obtained by polymerizing an acrylic monomer, optionally in the presence of a polymerization initiator. The acrylic polymer may be any polymer as long as the polymer can be bonded to a conductive object. The conductive object may be any of the following: a conductive adherend, a conductive auxiliary material, a conductive base material, and a conductive fixed object. (The definition of the conductive objects will be described below.) From the viewpoint of adhesion, a weight-average molecular weight of the acrylic polymer is preferably 100,000 or more to 5,000,000 or less, more preferably 200,000 or more to 4,000,000 or less, and further preferably 300,000 or more to 3,000,000 or less. The values of weight-average molecular weights mentioned in this specification are calculated using a GPC (System 21) of Shodex with tetrahydrofuran as a mobile phase. These values are polystyrene-equivalent weight-average molecular weights.

A glass-transition temperature (Tg) of the acrylic polymer is preferably 0° C. or lower, more preferably –20° C. or lower, and further preferably –40° C. or lower. The above-mentioned glass-transition temperature Tg can be calculated by, for example, the following Fox formula:

$$1/Tg=(W1/Tg1)+(W2/Tg2)+ \ldots +(Wn/Tgn)$$

The acrylic polymer may be cross-linked by the action of a cross-linking agent. Examples of the cross-linking agent include isocyanate-based cross-linking agents, such as toluene diisocyanate and methylenebisphenylisocyanate. The ratio of the cross-linking agent used is preferably 1 part by weight or more with respect to 100 parts by weight of the acrylic polymer. When an adhesive composition is formed as a layer on the base material, creep resistance and/or shear resistance of the layer can be improved by cross-linking the acrylic polymer. The ratio of the cross-linking agent used is more preferably 5 parts by weight or more to 10 parts by weight or less.

It is desirable that the acrylic polymer should contain copolymers including an alkyl (meth)acrylate having an alkyl group with 1 to 8 carbon atoms, a carboxyl group-containing acrylic monomer, and/or a hydroxyl group-containing acrylic monomer. The acrylic polymer containing these copolymers becomes an adhesive composition excellent in adhesibility.

(1) Acrylic Monomer

It is desirable that the acrylic monomer should contain an alkyl (meth)acrylate as a primary component (50% by weight or more) having an alkyl group with 1 to 14 carbon atoms. The term "(meth)acrylate" mentioned in this specification means methacrylate or acrylate.

As examples of the alkyl (meth)acrylate having the alkyl group with 1 to 14 carbon atoms, there may be mentioned methyl (meth)acrylate, ethyl (meth)acrylate, n-propyl (meth)acrylate, isopropyl (meth)acrylate, n-butyl (meth) acrylate, sec-butyl (meth)acrylate, t-butyl (meth)acrylate, n-octyl (meth)acrylate, isooctyl (meth)acrylate, 2-ethylhexyl (meth)acrylate, isononyl (meth)acrylate, and dodecyl (meth)acrylate. These alkyl (meth)acrylates may be used alone or in combination of two or more. Of these alkyl (meth)acrylates, the alkyl (meth)acrylate having an alkyl group with 1 to 8 carbon atoms is preferable, the alkyl (meth)acrylate having an alkyl group with 1 to 4 carbon atoms is more preferable, the n-butyl (meth)acrylate is further preferable, and the n-butyl acrylate is particularly preferable.

Examples of other acrylic monomers are carboxyl group-containing monomers, such as acrylic acid, methacrylic acid, and carboxyethyl acrylate; and hydroxyl group-containing monomers, such as 2-hydroxyethyl (meth)acrylate, 2-hydroxypropyl (meth)acrylate, 4-hydroxybutyl (meth) acrylate, 6-hydroxyhexyl (meth)acrylate, and (4-hydroxymethylcyclohexyl)-methyl acrylate. These other acrylic monomers may be used alone or in combination of two or more. Of these other acrylic monomers, it is desirable that any of the above carboxyl group-containing monomers or the above hydroxyl group-containing monomers, or both should be contained.

The acrylic monomer may not be formed from any of the above other acrylic monomers, but may be formed of the alkyl (meth)acrylate only. In order to easily obtain an adhesive composition with desired quality, it is preferable that 1% by weight or more to less than 50% by weight of the other acrylic monomer should be contained, more preferably 5% by weight or more to 30% by weight or less, and further preferably 5% by weight or more to 15% by weight or less.

In the case where any of the above carboxyl group-containing monomers or the above hydroxyl group-containing monomers, or both are contained, it is desirable that a total amount of both the monomers should range from 1 part by weight to 20 parts by weight, both inclusive, with respect to 100 parts by weight of an entire amount of all the monomers. Using both the monomers in this range can improve adhesive properties. It is more preferable that the total amount of both the monomers should range from 1 part by weight to 10 parts by weight, both inclusive.

To the (meth)acrylate, a vinylic monomer may be added as necessary. Examples of the vinylic monomer include itaconic acid, maleic acid, crotonic acid, maleic anhydride, itaconic anhydride, vinyl acetate, N-vinylpyrrolidone, N-vinylcarboxylic amides, styrene, and N-vinylcaprolactam. These vinylic monomers may be used alone or in combination of two or more.

(2) Polymerization Initiator

Examples of the polymerization initiator, which may be used optionally, include azo polymerization initiators, such as 2,2'-azobisisobutyronitrile, 2,2'-azobis(2-methylpropionamidine) disulfide, 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methylpropionate), 2,2'-azobis[2-methyl-N-(phenylmethyl)-propionamidin]dihydrochloride, 2,2'-azobis [2-(3,4,5,6-tetrahydropyrimidine-2-il)propane] dihydrochloride, and 2,2'-azobis[2-(2-imidazoline-2-il) propane]; persulfate-based polymerization initiators, such as potassium persulfate and ammonium persulfate; peroxide-based polymerization initiators, such as benzoyl peroxide, hydrogen peroxide, t-butyl hydroperoxide, di-t-butyl peroxide, t-butylperoxybenzoate, dicumyl peroxide, 1,1-bis(t- butylperoxy)-3,3,5-trimethylcyclohexane, 1,1-bis(t-butylperoxy)cyclododecane, 3,3,5-trimethyl cyclohexanoyl peroxide, and t-butyl peroxypivalate; and oxidation-reduction (redox) polymerization initiators containing persulfate and sodium hydrogen sulfite. These polymerization initiators may be used alone or in combination of two or more.

It is desirable that the polymerization initiator should be used in a range from 0.005 parts by weight to 1 part by weight, both inclusive, with respect to 100 parts by weight of the acrylic monomer. Using the polymerization initiator in this range makes it possible to form an acrylic polymer excellent in adhesive properties.

(3) Other Components

In order to easily apply the adhesive composition to the base material, the adhesive composition may contain other components, such as an organic solvent. The organic solvent is not particularly limited, and any publicly-known organic solvent may be used that is usable in an adhesive. Examples of the organic solvent include aliphatic hydrocarbons, such as hexane and heptane; esters, such as methyl acetate, ethyl acetate, and propyl acetate; and aromatic hydrocarbons, such as toluene, xylene, and ethyl benzene. These organic solvents may be used alone or in combination of two or more. It is preferable that the ratio of the organic solvent used should be adjusted in such a way that the solid content of the acrylic polymer becomes 10% by weight or more. It is more preferable that the ratio of the organic solvent used should be adjusted in such a way that the solid content of the acrylic polymer becomes 20% by weight or more to 50% by weight or less.

Ionic Liquid

The ionic liquid is salt in the form of liquid at room temperature, and is also referred to as ambient temperature molten salt. The ionic liquid also has properties, such as heat resistance, non-flammability, non-volatility, and chemical stability.

By applying a voltage to the ionic liquid, anions migrate to the positive pole side and cations migrate to the negative pole side. It is believed that the electrodes undergo oxidation-reduction reaction with the adhesive composition at an interface therebetween, allowing adhesibility of the adhesive composition to decrease and thereby allowing peelability to improve.

The ionic liquid in accordance with the present Embodiment has an ionic conductivity of $10^{-4}$ S/cm or more to $10^{-2}$ S/cm or less. The ionic liquid having the ionic conductivity in this range can sufficiently impart to the adhesive composition peelability induced by applying a voltage to the adhesive composition. It is more preferable that the ionic conductivity should be $10^{-3}$ S/cm or more to $10^{-2}$ S/cm or less. The ionic conductivity can be measured by, for example, an AC impedance method. The AC impedance method can measure an ionic conductivity of an ionic liquid, for example, as follows.

An ionic liquid is put between stainless plates in a bipolar cell at room temperature, and is controlled in the form of a disc having a certain area and thickness by using a spacer, obtaining a sample. A voltage is applied to this sample, and a Cole-Cole plot obtained when a frequency defining amplitude is changed is curve-fitted using an equivalent circuit, thereby obtaining a bulk resistance (Ω). An area A of the sample, a thickness L of the sample, and a bulk resistance Rb are applied to the following formula, calculating an ionic conductivity δ of the ionic liquid:

$$\delta = L/(Rb \times A)$$

wherein δ: ionic conductivity, Rb: bulk resistance, L: thickness (cm) of the sample, and A: area (cm$^2$) of the sample.

An example of the ionic liquid is represented, for example, by the following formula (1):

(1)

wherein $R^1$ represents a bivalent hydrocarbon group with 2 to 8 carbon atoms that may contain a heteroatom, and forms a ring with $N^+$ in the formula; $R^2$ and $R^3$ are the same or different and represent a hydrogen atom or an alkyl group with 1 to 6 carbon atoms (provided that when the nitrogen atom forms a double bond with an adjacent carbon atom, $R^3$ is not present); and $X^-$ represents an anion selected from Br, $AlCl_4^-$, $Al_2Cl_7^-$, $NO_3^-$, $BF_4^-$, $PF_6^-$, $CH_3COO^-$, $CF_3COO^-$, $CF_3SO_3^-$, $(CF_3SO_2)_2N^-$, $(FSO_2)_2N^-$, $(CF_3SO_2)_3C^-$, $AsF_6^-$, $SbF_6^-$, $F(HF)_n^-$, $CF_3(CF_2)_3SO_3^-$, $(CF_3CF_2SO_2)_2N^-$, and $CF_3CF_2COO^-$.

The ring formed of $R^1$ and $N^+$ in the above formula includes a ring in which at least one carbon atom is replaced by a nitrogen atom, the ring forming a hydrocarbon ring of, for example, saturated alicyclic hydrocarbon, such as cyclopropane, cyclobutane, cyclopentane, cyclohexane, cycloheptane, or cyclooctane, or unsaturated cyclic hydrocarbon, such as cyclopropene, cyclobutene, cyclopentene, cyclohexene, cycloheptene, cyclooctene, cyclopentadiene, or benzene. As examples of the heteroatom there may be mentioned N, O, S, and P; and preferably N.

As examples of the alkyl group with 1 to 6 carbon atoms there may be mentioned a methyl group, an ethyl group, a propyl group, a butyl group, a pentyl group, and a hexyl group. The alkyl group with 3 to 8 carbon atoms includes structural isomers.

To improve peelability after a voltage is applied, it is desirable that the above ionic liquid should be salt containing a cation and an anion, the cation being selected from pyridinium-based cation, cyclic aliphatic ammonium cation, and imidazolium-based cation, and the anion being selected from $(FSO_2)_2N^-$, $(CF_3SO_2)_2N^-$, and $BF_4^-$.

The ionic liquid is obtainable from DKS Co., Ltd., Kanto Chemical Co., Ltd., or Koei Chemical Co., Ltd. For example, from DKS Co., Ltd., 1-ethyl-3-methylimidazolium bis(fluorosulfonyl)imide (AS-110) is obtainable; from Kanto Chemical Co., Ltd., 1-hexylpyridinium bis(trifluoromethanesulfonyl)imide, N-butyl-N-methylpyrrolidinium bis(trifluoromethanesulfonyl)imide, and 1-ethyl-3-methylimidazolium tetrafluoroborate are obtainable; and from Koei Chemical Co., Ltd., 1-ethyl-3-methylimidazolium hexafluorophosphate (IL-C3), 1-butylpyridinium tetrafluoroborate (IL-P10), 1-hexylpyridinium bis(trifluoromethanesulfonyl) imide (IL-P14), and 1-ethyl-3-methylimidazolium bis(trifluoromethanesulfonyl)imide (EMI-TFSI) are obtainable.

Migration Accelerator

In the present Embodiment, the alkyl ether of the polyethylene glycol is used as a migration accelerator. Examples of the alkyl ether of the polyethylene glycol include polyethylene glycol mono(di)methylether, polyethylene glycol mono(di)ethylether, polyethylene glycol mono(di)propylether, polyethylene glycol mono(di)isopropylether, polyethylene glycol mono(di)butylether, polyethylene glycol mono(di)isobutylether, polyethylene glycol mono(di)methylether, and polyethylene glycol mono(di)pentylether. In particular, polyethylene glycol mono(di)methylether is preferable as the alkyl ether of the polyethylene glycol. The alkyl ether of the polyethylene glycol can be obtained from Nippon Nyukazai Co., Ltd., Toho Chemical Industry Co., Ltd., or others. The inventors believe that these alkyl ethers of the polyethylene glycol function as excellent migration accelerators to facilitate the migration of the ionic liquid when a voltage is applied. The alkyl ethers of the polyethylene glycol may be used alone or in combination of two or more.

It is preferable that the alkyl ether of the polyethylene glycol should have a weight-average molecular weight of 120 or more to 600 or less; more preferably a weight-average molecular weight of 120 or more to 550 or less; more preferably a weight-average molecular weight of 120 or more to 500 or less; and more preferably a weight-average molecular weight of 120 or more to 360 or less. The upper limit of the weight-average molecular weight of the alkyl ether of the polyethylene glycol is, for example, 600, 590, 580, 570, 560, 550, 540, 530, 520, 510, 500, 490, 480, 470, 460, 450, 440, 430, 420, 410, 400, 390, 380, 370, 360, 355, 350, and 340. The lower limit of the weight-average molecular weight of the alkyl ether of the polyethylene glycol is, for example, 120, 125, 130, 135, 140, 145, 150, 155, and 160. The weight-average molecular weights mentioned in this specification are values calculated using the GPC. By using the alkyl ether of the polyethylene glycol having this range of the weight-average molecular weight, an adhesive composition can be provided that has sufficient peelability but does not leave any adhesive deposit even when a low voltage, such as 30 V or less, is applied to the adhesive composition. Particularly by using the polyethylene glycol mono(di)methylether having a weight-average molecular weight of 120 or more to 360 or less, an electrically peelable adhesive composition can be provided that is excellent in adhesibility before the application of voltage and in peelability after the application of voltage but does not leave any adhesive deposit. It has been confirmed that an adhesive composition containing a traditional polyethylene glycol does not exhibit sufficiently low adhesion when a low voltage is applied to the adhesive composition, with the result that the adhesive composition is difficult to peel. The inventors have found, contrary to their expectations, that the characteristics of the adhesive composition—such as the excellent adhesibility before the application of voltage and the excellent peelability without leaving any adhesive deposit after the application of voltage—are phenomena specific to the adhesive composition using the alkyl ether of the polyethylene glycol.

A content of the ionic liquid and of the migration accelerator contained in the adhesive composition ranges from 5 parts by weight to 30 parts by weight, both inclusive, with respect to 100 parts by weight of the acrylic polymer. The upper limit of the content of the ionic liquid and of the migration accelerator contained in the adhesive composition is, for example, 30 parts by weight, 29 parts by weight, 28 parts by weight, 27 parts by weight, 26 parts by weight, and 25 parts by weight, with respect to 100 parts by weight of the acrylic polymer. The lower limit of the content of the ionic liquid and of the migration accelerator contained in the adhesive composition is, for example, 5 parts by weight, 6 parts by weight, 7 parts by weight, 8 parts by weight, and 9 parts by weight, with respect to 100 parts by weight of the acrylic polymer. With these ranges of the contents of the ionic liquid and the migration accelerator, an electrically peelable adhesive composition can be provided that is excellent in adhesibility before the application of voltage and in peelability after the application of voltage but does not leave any adhesive deposit.

Additives

The adhesive composition in accordance with the present Embodiment may contain additives in addition to the above components, the additives including, for example, a conductive filler, a plasticizer, a stainer, an antioxidant, a filler, a flame retardant, and a surfactant.

As examples of the conductive filler there may be mentioned carbon grains and carbon fibers of graphite, carbon black, or the like, and metal grains of silver, copper, or the like.

Method for Preparing Adhesive Composition

The adhesive composition in accordance with the present Embodiment can be prepared by stirring the acrylic polymer, the ionic liquid, the migration accelerator, and optionally the cross-linking agent, by a publicly known method. To stir the above components, for example, a dissolver may be used. The above-mentioned additives may have been added during stirring.

Usage of Adhesive Composition

The adhesive composition in accordance with the present Embodiment can be easily peeled off from a conductive object by applying a voltage to the adhesive composition, without subjecting the adhesive composition to UV irradiation or heat treatment. Therefore, the adhesive composition can be suitably used to adhesively fix an impermeable material unapt at UV irradiation or a material sensitive to heat. The adhesive composition of the present invention is suitable to adhesively fix a conductive object, and thus can be suitably used to fix a material that requires high processing accuracy or a material that is difficult to physically fix a thin metal plate, substrate, or the like. The adhesive composition can be used, for example, for temporary fixing of components during the electronic component manufacturing process (for example, temporary fixing of wafers during dicing of LSI chips); and then the temporary fixing can be easily released by applying voltage to the adhesive composition, without leaving any adhesive residue.

The adhesive composition in accordance with the present Embodiment can be peeled off from the conductive object without leaving any adhesive residue. This means that, for example, if a product, such as a home appliance, a PC, or the like, is to contain rare and valuable parts or parts that need to be safely collected and reused, the parts can be fixed to the product with the adhesive composition of the present invention, and the product can be sold; and then the home appliance, the PC, or the like is collected after being used; and the parts can be easily collected by applying voltage to the fixed parts. The ability to easily collect parts, etc. is useful from the perspective of recycling and reuse.

Other usages of the adhesive composition include bonding of a sensor to a conductive object. Even in this usage, the sensor can be easily collected by peeling off the sensor by applying low voltage; and the sensor can be used repeatedly, which is economical.

Electrically Peelable Adhesive Product

An electrically peelable adhesive product in accordance with the present Embodiment (hereinafter also referred to simply as an adhesive product) comprises a base material and an electrically peelable adhesive layer that is formed in contact with the base material. Another aspect of the adhesive product is that the adhesive product comprises a core material and two electrically peelable adhesive layers that are formed in contact with both sides of the core material.

These electrically peelable adhesive layers of the adhesive product contain an electrically peelable adhesive composition. The adhesive product in accordance with the present Embodiment functions as a substance that fixes an object (referred to as a fixed object), which is to be fixed to an adherend with the adhesive product, to the adherend.

A form of the adhesive product is not particularly limited; however, the adhesive product may be in the form of, for example, an adhesive tape, an adhesive sheet, or any other appropriate form suitable for its usage. A surface to be used of the electrically peelable adhesive layers may be protected with a polyethylene terephthalate film or a release paper, which have been subjected to a peeling process, until being used.

The adherend in accordance with the present Embodiment refers to an object that provides a place for the fixed object to be fixed using the electrically peelable adhesive composition, the electrically peelable adhesive layer, or the adhesive product in accordance with the present Embodiment.

Here, fixation can be direct or indirect: The direct fixation means that the adherend and the fixed object are in direct contact with the adhesive product, while the indirect fixation means that the adherend and/or the fixed object is not in direct contact with the adhesive product, but is in contact via a conductive auxiliary material. As long as the fixed object can be fixed to the adherend, the fixation can be either the direct fixation or the indirect fixation.

The adherend may be either an adherend with conductivity (conductive adherend) or an adherend without conductivity (non-conductive adherend). If the adherend is the conductive adherend, an adhesive product may be directly adherend to the adherend. If the adherend is the non-conductive adherend, it is necessary to adhere a conductive auxiliary material to the non-conductive adherend. When adhering the conductive auxiliary material, an adhesive or a glue may be optionally used.

Examples of the conductive adherend include a metal plate, a metal product, and a metal workbench, all of which being made of a metal, such as iron, aluminum, copper, silver, or gold, or an alloy of these metals. Examples of the non-conductive adherend include a wooden plywood, a plastic product, and a non-metal workbench.

The fixed object in accordance with the present Embodiment is not particularly limited; however, if the fixed object is conductive, the fixed object may be directly adherend to the adhesive product. If the fixed object is non-conductive, it is necessary to adhere a conductive auxiliary material to the non-conductive fixed object and then to adhere the non-conductive fixed object to the adhesive product, in the same manner as in the non-conductive adherend.

Examples of the conductive fixed object include a foil (which is less than 100 µm in thickness); a plate (which is 100 µm or more in thickness), both of which being made of a metal, such as iron, aluminum, copper, silver, or gold, or an alloy of these metals; a mesh or a cloth formed of fibers made of or coated with the metal or the alloy; a resin sheet made of the metal or the alloy; and a resin plate formed of layers made of the metal, the alloy, or a conductive metal oxide. Examples of the non-conductive fixed object include a resin plate and a plastic plate.

The base material in accordance with the present Embodiment refers to a flat object to which the electrically peelable adhesive composition is applied. The base material may be conductive or non-conductive.

Examples of the base material to be used for the adhesive product include a foil and a plate made of a metal, such as aluminum, copper, silver, or gold, or an alloy of these metals; a film made of PET or polyimide; a carbon fiber; paper; a woven fabric; and a non-woven fabric. A thickness thereof is not particularly limited. However, the non-conductive base material to be used for the adhesive product should be peeled off before use. These can be selected as appropriate depending upon a shape of the electrically peelable adhesive product.

The electrically peelable adhesive layer may be formed on one side of the base material or on both sides thereof. In this case, the base material is referred to as a core material. The core material must be capable of allowing the ionic liquid to pass through each of the electrically peelable adhesives when voltage is applied. By being a material capable of allowing the ionic liquid to pass, the core material is capable of allowing the voltage to be applied to the electrically peelable adhesive layers on both sides of the core material.

By using the base material or the core material, the adhesive product can be made stronger, thereby improving its workability during its use.

The conductive auxiliary material is not particularly limited as long as the conductive auxiliary material has conductivity; and examples of the conductive auxiliary material include a film made of a metal, such as aluminum, copper, silver, or gold, or an alloy of these metals, or vapor-deposited with a conductive metal oxide (such as ITO); a cloth formed of fibers made of or coated with the metal or the alloy; a resin sheet made of the metal or the alloy; and a resin plate formed of layers made of the metal, the alloy, or a conductive metal oxide.

Figure 1:
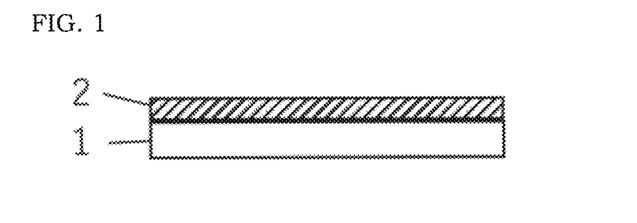
FIG. 1 shows an example of an electrically peelable adhesive product in the form of a single-sided tape.
Figure 2:
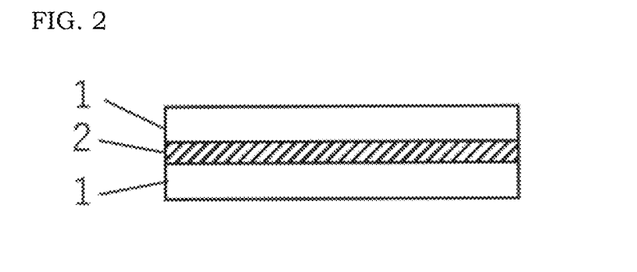
FIG. 2 shows an example of an electrically peelable adhesive product in the form of a double-sided tape.

FIG. 1 shows an example of an adhesive product in the form of a single-sided tape; and FIG. 2 shows an example of an adhesive product in the form of a double-sided tape. FIG. 3A to FIG. 7B show examples of circuits for applying a voltage to electrically peelable adhesive layers of these adhesive products through a conductive object and also examples of the peeling after the application of the voltage. The usage aspects of the adhesive products of the present invention are not limited to the below circuit examples and peeling examples. In the following peeling examples, the electrically peelable adhesive layers or the adhesive products are described as remaining on the adherend side; however, by reversing the positive and negative directions of a direct current (DC) power supply in each example, the peeling can be performed so that the adhesive products remain on a fixed object. Which side of the power supply the adhesive products will remain on depends upon the composition of the adhesive products and is not particularly limited.

In the drawings, the reference sign 1 indicates an electrically peelable adhesive layer, the reference sign 2 indicates a base material or a core material, the reference sign 3 indicates a conductive adherend, the reference sign 4 indicates a DC power supply, the reference sign 5 indicates a conductive fixed object, the reference sign 6 indicates a non-conductive fixed object, the reference sign 7 indicates an optional adhesive or glue, the reference sign 8 indicates a conductive auxiliary material, and the reference sign 9 indicates a non-conductive adherend.

Figure 3A:
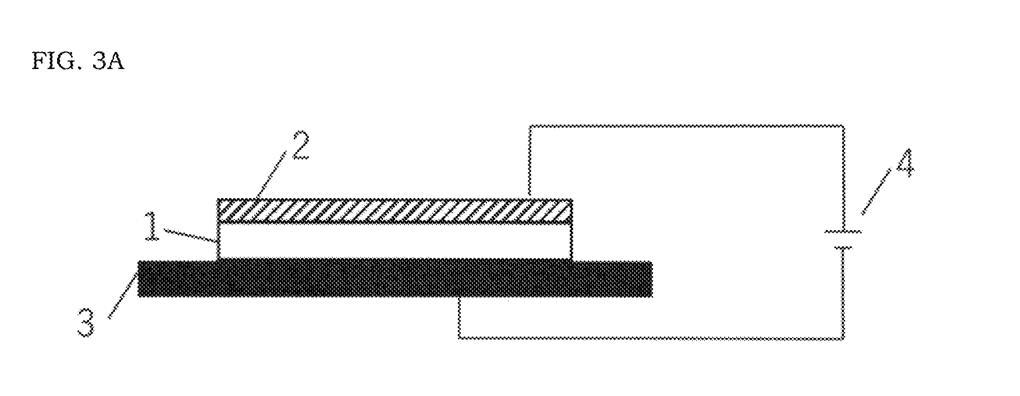
FIG. 3A shows an example of a circuit for applying a voltage to a conductive adherend and a conductive base material to peel the conductive base material from an electrically peelable adhesive product.
Figure 3B:
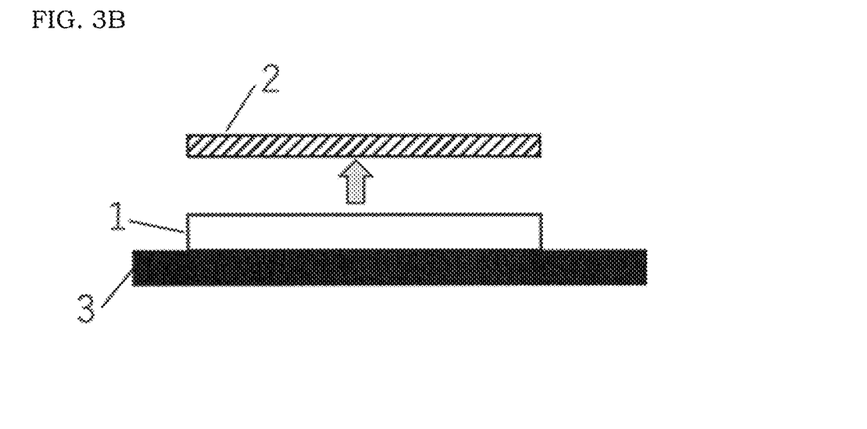
FIG. 3B shows an example of the peeling after the application of the voltage.

FIG. 3A shows an example in which a single-sided adhesive product adheres to a conductive adherend 3, and a voltage is applied. A base material 2 here is made of a conductive material. As shown in FIG. 3A, the base material 2 and the conductive adherend 3 are connected with terminals, respectively, forming a circuit with a DC power supply 4 to apply the voltage to an electrically peelable adhesive layer 1; and as shown in FIG. 3B, the conductive base material 2 can be peeled off from the conductive adherend 3.

Figure 4A:
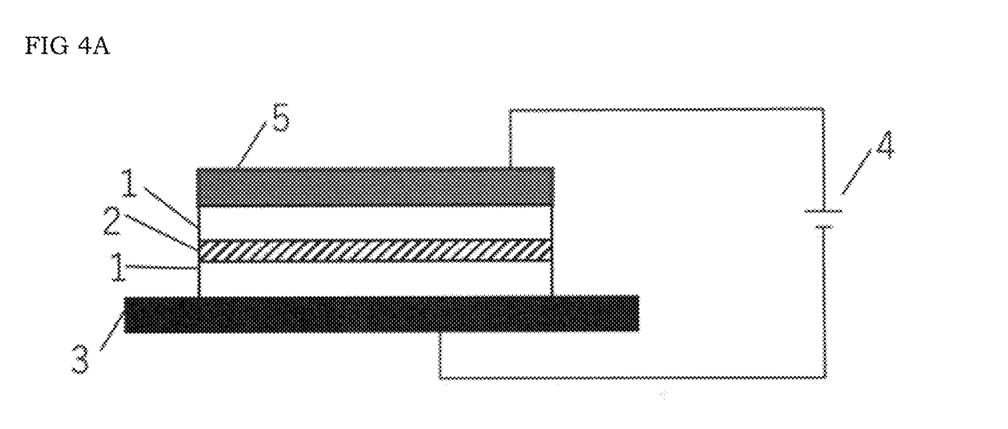
FIG. 4A shows an example of a circuit for applying a voltage to a conductive adherend and a conductive fixed object to peel the conductive fixed object from an electrically peelable adhesive product.
Figure 4B:
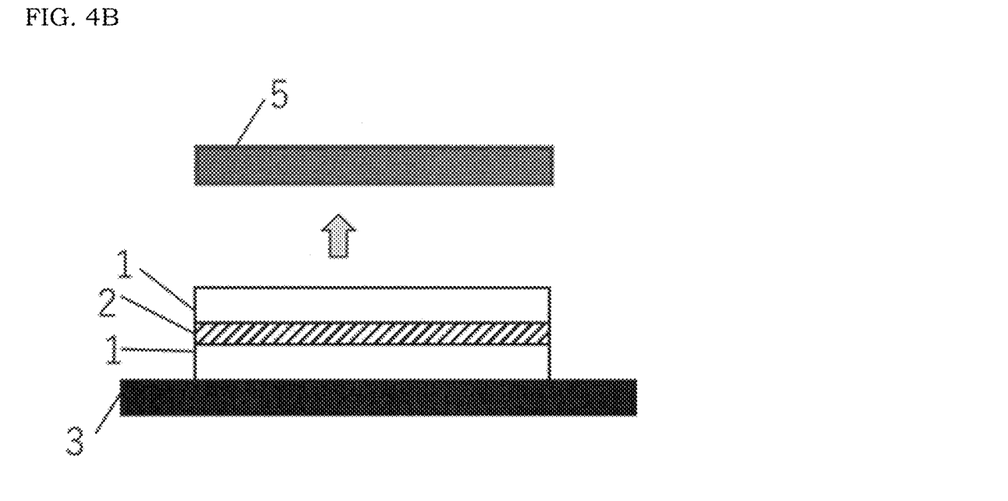
FIG. 4B shows an example of the peeling after the application of the voltage.

FIG. 4A shows an example in which a conductive fixed object 5 is adhered to the conductive adherend 3 by using a double-sided adhesive product, and a voltage is applied. The double-sided tape is formed of the electrically peelable adhesive layers 1 placed on both sides of a core material 2. As shown in FIG. 4A, the conductive fixed object 5 and the conductive adherend 3 are connected with terminals, respectively, forming a circuit with the DC power supply 4 to apply the voltage to the electrically peelable adhesive layer 1; and as shown in FIG. 4B, the conductive fixed object 5 can be peeled off from the conductive adherend 3.

Figure 5A:
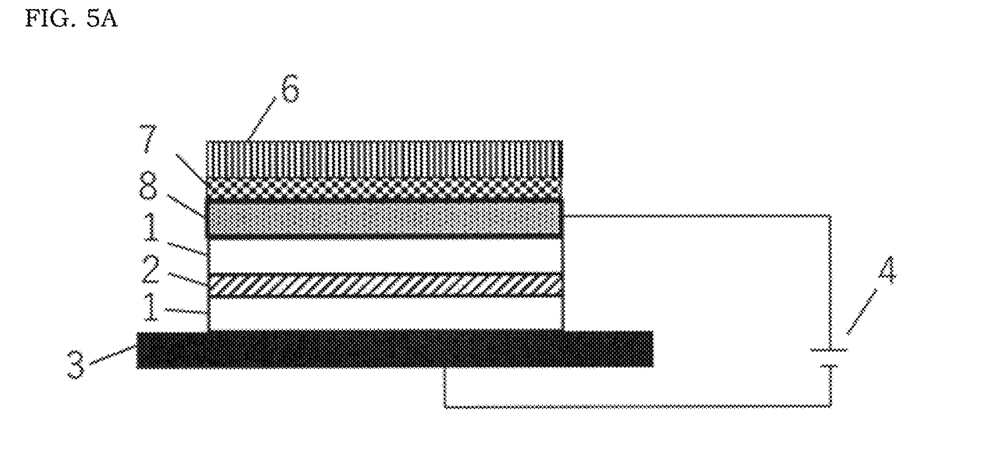
FIG. 5A shows an example of a circuit for applying a voltage to a conductive adherend and a conductive auxiliary material to peel a non-conductive fixed object from an electrically peelable adhesive product.
Figure 5B:
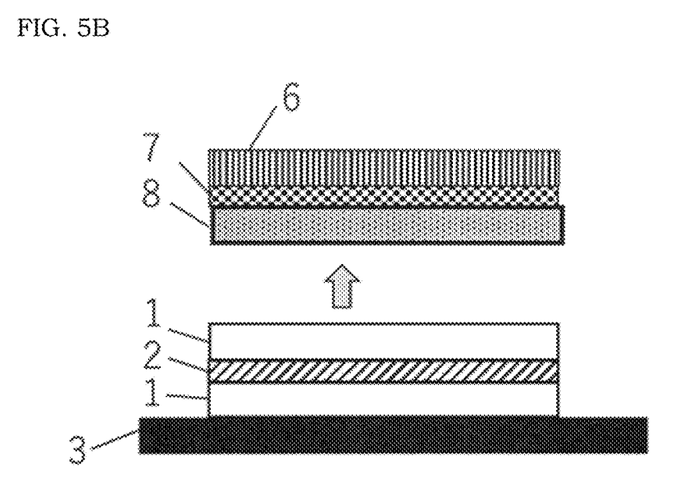
FIG. 5B shows an example of the peeling after the application of the voltage.

FIG. 5A shows an example of a non-conductive fixed object 6 being adhered to the conductive adherend 3 using the double-sided adhesive product, and voltage is applied. As shown in FIG. 5A, an aluminum plate is attached to the non-conductive fixed object 6 using an optional adhesive or glue 7 as a conductive auxiliary material 8; and the non-conductive fixed object 6 and the conductive auxiliary material 8 are adhered to the conductive adherend 3 using the adhesive product. By connecting the conductive auxiliary material 8 and the conductive adherend 3 with terminals, respectively, and forming a circuit with the DC power supply 4, a voltage is applied to the electrically peelable adhesive layer 1; and as shown in FIG. 5B, the non-conductive fixed object 6 can be peeled off from the conductive adherend 3. In this case, the conductive auxiliary material 8 attached to the non-conductive fixed object 6 remains on the non-conductive fixed object 6.

Figure 6A:
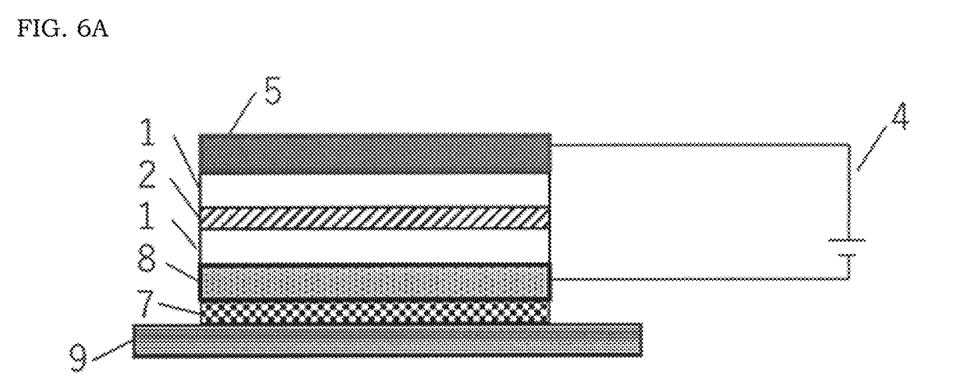
FIG. 6A shows an example of a circuit for applying a voltage to a conductive auxiliary material and a conductive fixed object to peel the conductive fixed object from an electrically peelable adhesive product.
Figure 6B:
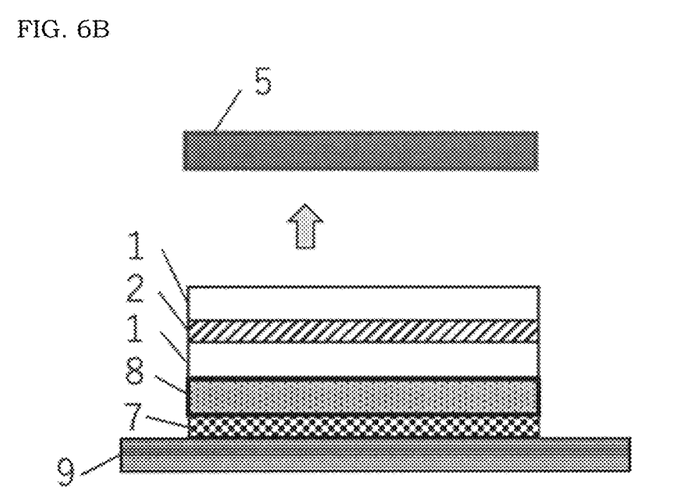
FIG. 6B shows an example of the peeling after the application of the voltage.

FIG. 6A shows an example of adhering the conductive fixed object 5 to a non-conductive adherend 9 using the double-sided adhesive product and applying voltage. As shown in FIG. 6A, an aluminum plate is adhered to the non-conductive adherend 9 using an optional adhesive or glue 7 as the conductive auxiliary material 8; and the conductive fixed object 5 is adhered to the conductive auxiliary material 8 and the non-conductive adherend 9 using the adhesive product. By connecting the conductive fixed object 5 and the conductive auxiliary material 8 with terminals, respectively, and forming a circuit with the DC power supply 4, a voltage is applied to the electrically peelable adhesive layer 1, peeling off the conductive fixed object 5 from the non-conductive adherend 9 as shown in FIG. 6B.

Figure 7A:
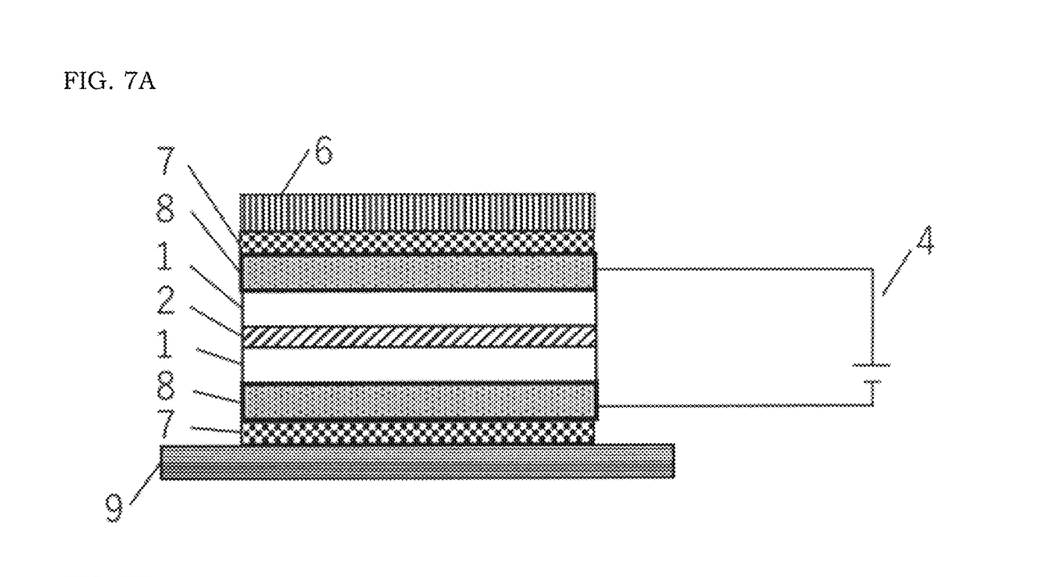
FIG. 7A shows an example of a circuit for applying a voltage to a conductive auxiliary material adhered to a non-conductive adherend and a conductive auxiliary material adhered to a non-conductive fixed object to peel the non-conductive fixed object from an electrically peelable adhesive product.
Figure 7B:
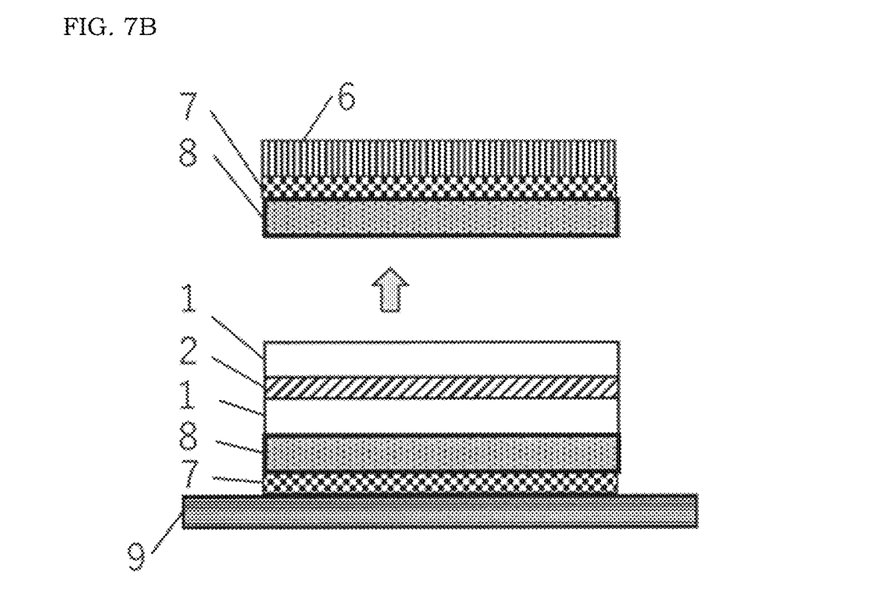
FIG. 7B shows an example of the peeling after the application of the voltage.

FIG. 7A shows an example of adhering the non-conductive fixed object 6 to the non-conductive adherend 9 using the double-sided adhesive product and applying voltage. As shown in FIG. 7A, aluminum plates are attached to the non-conductive fixed object 6 and the non-conductive adherend 9, respectively, using optional adhesives or glues 7 as the conductive auxiliary materials 8; and the conductive auxiliary material 8 adhered to the non-conductive fixed object 6 is adhered to the conductive auxiliary material 8 adhered to the non-conductive adherend 9, using the adhesive product. By connecting the conductive auxiliary materials 8 with terminals, respectively, and forming a circuit with the DC power supply 4, a voltage is applied to the electrically peelable adhesive layer 1; and the non-conductive fixed object 6 can be peeled off from the non-conductive adherend 9 as shown in FIG. 7B. In this case, the conductive auxiliary material 8 attached to the non-conductive fixed object 6 remains on the non-conductive fixed object 6.

The adhesive product in accordance with the present Embodiment is capable of performing each of the above peeling processes by applying a voltage of 30 V or less.

The electrically peelable adhesive layer can be formed, for example, by applying an adhesive composition to the base material or the core material. How to apply the adhesive composition is not particularly limited; however, the following may be, for example, used: a spin coater, a gravure coater, an applicator, a multi-coater, a die coater, a bar coater, a roll coater, a blade coater, or a knife coater. A thickness of the electrically peelable adhesive layer is not particularly limited; however, the thickness is desirable to be in a range of 200 μm to 25 μm. If the thickness of the electrically peelable adhesive layer is within this range, it is possible to provide an adhesive product with strong adhesibility before the application of voltage and excellent peelability after the application of voltage. After the adhesive composition is applied, the electrically peelable adhesive layer may be heated to dry the adhesive composition.

It is desirable that the electrically peelable adhesive layer should have an adhesibility of 25 N/25 mm or more before the application of voltage. The electrically peelable adhesive layer having the adhesibility of 25 N/25 mm or more is capable of preparing the adhesive product with excellent fixation to the adherend.

Method for Manufacturing Electrically Peelable Adhesive Product

One Embodiment of the present invention is about a method for manufacturing an electrically peelable adhesive product. The electrically peelable adhesive product can be manufactured by applying the electrically peelable adhesive composition to the base material or the core material. The details of the electrically peelable adhesive composition, the electrically peelable adhesive layer, the base material, and the electrically peelable adhesive product are as described above.

Peeling Method

The electrically peelable adhesive layer or the adhesive product in accordance with the present Embodiment is adhered directly to a conductive object and then can be peeled from the conductive object by applying a voltage.

How to peel the electrically peelable adhesive layer or the adhesive product is, for example, that if a fixed object and an adherend are conductive, the fixed object and the adherend are connected with terminals, and voltage is applied to both the terminals, thereby peeling the electrically peelable adhesive layer or the adhesive product from the fixed object or the adherend. If a fixed object and/or an adherend is not conductive, an aluminum plate or the like as a conductive auxiliary material is adhered or glued to the fixed object and/or the adherend, thereby allowing the fixed object and/or the adherend, which is still non-conductive, to be subjected to a fixing and peeling process. The fixing and peeling process is exemplified as the above peeling examples of the adhesive product.

The voltage to be applied is not particularly limited as long as the voltage can allow for the peeling; however, in consideration for a size of a voltage application device, a harmful effect on the fixed object, and risk to human health from accidents during work, the low voltage is desirable. The upper limit may be selected from, for example, 200 V, 120 V, 100 V, 90 V, 80 V, 70 V, 60 V, 50 V, 40 V, 30 V, and 20 V, and the lower limit may be selected from, for example, 5 V, 6 V, 7 V, 8 V, 9 V, 10 V, and 15 V; and the above upper limit and the above lower limit may be combined to make a range of the voltage to be applied. Of the various ranges, work at the range of the low voltage particularly from 10 V to 30 V is preferable, from the viewpoint of the downsizing of the voltage application device, the safety, and the harmful effect on the fixed object.

The electrically peelable adhesive layer and the adhesive product in accordance with the present Embodiment can be peeled off from the conductive object even when the voltage to be applied is as low as a few volts; therefore, the peeling process can be carried out even if, for example, a commercially available battery is used as a power source. This is proved by the present Embodiments that a simple voltage application device that is excellent in safety of workers and is easy to carry can carry out the peeling process.

A voltage application time is not particularly limited as long as the electrically peelable adhesive layer or the adhesive product can be peeled; however, a voltage application time of 3 minutes or less is desirable, from the viewpoint of a harmful effect on the fixed object. It is particularly desirable, from the viewpoint of the safety and a harmful effect on the adherend, that the electrically peelable adhesive layer or the adhesive product should be peeled from the conductive object without leaving any adhesive residue by applying a voltage of 10 V for 10 seconds.

A temperature at the time of the peeling is not particularly limited; however, it is desirable, from the viewpoint of easiness of the peeling process, that the peeling should be carried out at room temperature. As described above, the electrically peelable adhesive layer or the adhesive product in accordance with the present Embodiment can be peeled off from the conductive object at low voltage and in a short time, and thus can be peeled off with very little thermal effect on the fixed object.

One Embodiment of the present invention includes usage of an acrylic polymer for preparing an electrically peelable adhesive composition, an ionic liquid having an ionic conductivity of $10^{-4}$ S/cm or more to $10^{-2}$ S/cm or less, and an alkyl ether of a polyethylene glycol. The acrylic polymer, the ionic liquid, and the alkyl ether of the polyethylene glycol are mixed in such a way that an amount of the ionic liquid and of the alkyl ether of the polyethylene glycol becomes 5 parts by weight or more to 30 parts by weight or less with respect to 100 parts by weight of the acrylic polymer; and to the mixture, a cross-linking agent, an additive, and so forth are optionally added; and then the mixture thereby obtained is stirred by a known method, preparing an electrically peelable adhesive composition. The details of the acrylic polymer, the ionic liquid, the alkyl ether of the polyethylene glycol, the cross-linking agent, and the additive are as described above.

One Embodiment of the present invention includes usage of an electrically peelable adhesive composition for preparing an electrically peelable adhesive product. The electrically peelable adhesive product may be manufactured by forming an electrically peelable adhesive layer on a base material (or a core material) using the electrically peelable adhesive composition. The details of the electrically peelable adhesive composition, the electrically peelable adhesive layer, the base material, and the electrically peelable adhesive product are as described above.

EXAMPLES

Hereinafter, the present invention will be described with reference to Examples; however, the present invention is not limited to the below Examples.

Example 1

An adhesive product was manufactured as follows with use of an acrylic polymer, an ionic liquid, and a migration accelerator.

1. Preparation of Acrylic Polymer

Into a glass flask, a monomer mixture including 91 parts by weight of n-butyl acrylate (Mitsubishi Chemical Corporation), 8 parts by weight of acrylic acid (Mitsubishi Chemical Corporation), and 1 part by weight of 2-hydroxyethyl methacrylate (Nippon Shokubai Co., Ltd.) and 186 parts by weight of a polymerization solvent (ratio by weight of acetic ether:toluene=9:1) were poured; air in the flask was substituted by a nitrogen gas; 0.2 parts by weight of azobisisobutyronitrile (AIBN; Junsei Chemical Co., Ltd.) as a polymerization initiator was added thereto; the mixture thereby obtained was heated to 85° C. and allowed to polymerize for 5 hours, obtaining an acrylic adhesive. The acrylic adhesive thereby obtained was found to have 35% by weight of an acrylic polymer (weight-average molecular weight of about 800,000 and Tg of −46° C.) and a viscosity of 7,000 mPa·s.

2. Preparation of Adhesive Composition

To 100 parts by weight of the above acrylic adhesive (35 parts by weight of the acrylic polymer), 3 parts by weight of CORONATE L-55E (Tosoh Corporation) as an isocyanate-based cross-linking agent, 3.5 parts by weight of $EMIBF_4$ (Kanto Chemical Co., Ltd.; ionic conductivity of $1.4 \times 10^{-2}$ S/cm) as an ionic liquid, and 3.5 parts by weight of dimethyltetraglycol (Nippon Nyukazai Co., Ltd.; molecular weight of about 220) as a migration accelerator were added, and then the mixture thereby obtained was stirred with a dissolver at room temperature for 10 minutes and then allowed to stand to defoam, obtaining an adhesive composition.

3. Measurement of Ionic Conductivity

The ionic liquid was measured for ionic conductivity as follows. The measurement was carried out at room temperature, by an AC impedance method, and with use of a 1,260-frequency response analyzer (of Solartron). More specifically, the ionic liquid was put between stainless plates in a bipolar cell (Tokyo Systems Laboratories, Inc.) and controlled in the form of a disc having a certain area A (0.07 cm$^2$) and thickness L (0.09 cm) by using a Teflon™-coated spacer, obtaining a sample. To this sample, a voltage with an amplitude of 10 mV was applied; and a Cole-Cole plot to be obtained when the frequency defining the amplitude is changed from 1 MHz to 0.1 Hz was curve-fitted using an equivalent circuit, thereby obtaining a bulk resistance (Ω). The area A of the sample, the thickness L of the sample, and the bulk resistance Rb were applied to the following formula, calculating an ionic conductivity δ of the ionic liquid:

$$\delta = L/(Rb \times A)$$

wherein δ: ionic conductivity, Rb: bulk resistance, L: thickness (cm) of the sample, and A: area (cm$^2$) of the sample.

4. Manufacture of Adhesive Product

The above adhesive composition was applied to a polyethylene terephthalate film (E-7006 of Toyobo Co., Ltd.; thickness of 75 μm) whose surfaces have been pre-treated with the peeling process; a coating thereby obtained was dried at 100° C. for 5 minutes and thereby became an electrically peelable adhesive layer having a thickness of 40 μm; and then the electrically peelable adhesive layer was placed on a 50-μm-thickness aluminum foil (base material). The foil was then allowed to be cured at 40° C. for 3 days, thereby obtaining a single-sided adhesive product (single-sided tape). The adhesive tape thereby obtained was evaluated as follows.

Example 2

An adhesive product was obtained in the same manner as in Example 1, except that the thickness of the electrically peelable adhesive layer was changed to 80 μm.

Example 3

An adhesive product was obtained in the same manner as in Example 1, except that IL-P14 (Koei Chemical Co., Ltd.) was used as the ionic liquid.

Example 4

An adhesive product was obtained in the same manner as in Example 1, except that AS-110 (DKS Co., Ltd.) was used as the ionic liquid.

Example 5

An adhesive product was obtained in the same manner as in Example 1, except that EMI-TFSI (Koei Chemical Co., Ltd.) was used as the ionic liquid.

Example 6

An adhesive product was obtained in the same manner as in Example 1, except that 7.0 parts by weight of EMI-TFSI was used as the ionic liquid, and the amount of the migration accelerator was changed to 7.0 parts by weight.

Example 7

An adhesive product was obtained in the same manner as in Example 1, except that 7.0 parts by weight of EMI-TFSI was used as the ionic liquid, the amount of the migration accelerator was changed to 7.0 parts by weight, and the thickness of the electrically peelable adhesive layer was changed to 80 μm.

Example 8

An adhesive product was obtained in the same manner as in Example 1, except that 7.0 parts by weight of EMI-TFSI was used as the ionic liquid, and 7.0 parts by weight of dimethyltriglycol (Nippon Nyukazai Co., Ltd.; molecular weight of about 178) was used as the migration accelerator.

Example 9

An adhesive product was obtained in the same manner as in Example 1, except that 1.75 parts by weight of AS-110 was used as the ionic liquid.

Example 10

An adhesive product was obtained in the same manner as in Example 1, except that AS-110 was used as the ionic liquid, and the amount of the migration accelerator was changed to 10.5 parts by weight.

Example 11

An adhesive product was obtained in the same manner as in Example 1, except that EMI-TFSI was used as the ionic liquid, and polyethylene glycol monomethylether (Nippon Nyukazai Co., Ltd.; molecular weight of about 240) was used as the migration accelerator.

Example 12

An adhesive product was obtained in the same manner as in Example 1, except that 1.75 parts by weight of EMI-TFSI was used as the ionic liquid, and polyethylene glycol monomethylether was used as the migration accelerator.

Example 13

An adhesive product was obtained in the same manner as in Example 1, except that EMI-TFSI was used as the ionic liquid, and 10.5 parts by weight of polyethylene glycol monomethylether was used as the migration accelerator.

Example 14

An adhesive product was obtained in the same manner as in Example 1, except that EMI-TFSI was used as the ionic liquid, and triethylene glycol monomethylether (Nippon Nyukazai Co., Ltd.; molecular weight of about 164) was used as the migration accelerator.

Comparative Example 1

An adhesive product was obtained in the same manner as in Example 1, except that the migration accelerator was not used.

Comparative Example 2

An adhesive product was obtained in the same manner as in Example 1, except that IL-P14 was used as the ionic liquid, and the migration accelerator was not used.

Comparative Example 3

An adhesive product was obtained in the same manner as in Example 1, except that AS-110 was used as the ionic liquid, and the migration accelerator was not used.

Comparative Example 4

An adhesive product was obtained in the same manner as in Example 1, except that EMI-TFSI was used as the ionic liquid, and the migration accelerator was not used.

Comparative Example 5

An adhesive product was obtained in the same manner as in Example 1, except that polyethylene glycol 400 (DKS Co., Ltd.) was used as the migration accelerator.

Comparative Example 6

An adhesive product was obtained in the same manner as in Example 1, except that AS-110 was used as the ionic liquid, and polyethylene glycol 400 was used as the migration accelerator.

Comparative Example 7

An adhesive product was obtained in the same manner as in Example 1, except that 1.05 parts by weight of EMI-TFSI was used as the ionic liquid.

Comparative Example 8

An adhesive product was obtained in the same manner as in Example 1, except that EMI-TFSI was used as the ionic liquid, and the amount of the migration accelerator was changed to 12.25 parts by weight.

Comparative Example 9

An adhesive product was obtained in the same manner as in Example 1, except that 1.05 parts by weight of AS-110 was used as the ionic liquid.

5. Evaluations of Adhesive Products (1) Measurement of Adhesibility

Each of the adhesive products of Examples 1 to 14 and Comparative Examples 1 to 9 was cut into a piece that is 25 mm wide and 250 mm long, and five adhesive tapes were obtained from each of the adhesive products of the Examples and the Comparative Examples. The adhesive tapes were placed on polished stainless plates (conductive adherends) in such a way that the electrically peelable adhesive layer side of the adhesive tapes came in contact with the stainless plates, and the adhesive tapes were pressure-bonded to the stainless plates by reciprocating a 2 kg rubber roller once in a length direction of the sample pieces at a speed of 300 mm/min, thereby obtaining evaluation samples. Thirty minutes after the pressure-bonding, a force (adhesibility: N/25 mm) required to peel the adhesive tapes of the evaluation samples from the adherends at an angle of 180° (180° peeling) and a tension rate of 300 mm/min was measured using an autograph AGSH manufactured by Shimadzu Corporation, in accordance with the Japanese Industrial Standards (JIS Z-0237 (2009)), thereby obtaining, as measured values, average values measured from the evaluation samples.

In the same manner as the above, 30 minutes after the pressure-bonding of the prepared adhesive tapes to the adherends, electrodes were attached to the evaluation samples in such a way that the conductive adherend side of the evaluation samples became a positive terminal, and the base material side became a negative terminal; and a voltage of 10 V was applied to the evaluation samples for 10 seconds using a transformer connected with a household power supply as a power source. After the application of the voltage, a force required to peel the adhesive tapes at an angle of 180° from the adherends was measured in the same manner as the above.

(2) Evaluation of Adhesive Deposits

After the adhesive tapes were peeled, the conductive adherends were visually observed; and if the adhesive was observed on the conductive adherend side, it was considered "adhesive deposits present", and if the adhesive was not observed on the conductive adherend side, it was considered "adhesive deposits absent."

(3) Evaluation of Peelability

Peelability of the adhesive products was evaluated by measuring a reduced degree (rate of decrease) of the adhesibility after the voltage application. The rate of decrease was calculated by the following formula:

rate of decrease=(adhesibility before voltage application−adhesibility after voltage application)/adhesibility before voltage application×100(%)

When the rate of decrease is 80% or more, the voltage application eases the peeling of the adhesive products. When the rate of decrease is more than 50% to 80% or less, the adhesive products are still peelable; however, when the rate of decrease is less than 50%, the adhesive products are difficult to peel.

Table 1 shows types of the ionic liquids used in Examples 1 to 14 and Comparative Examples 1 to 9 and amounts thereof used, types of the migration accelerators and amounts thereof used, thicknesses of the electrically peelable adhesive layers, and evaluation results of every adhesive product. In Table 1, the amounts used are converted into amounts with respect to 100 parts by weight of the acrylic polymer. In this Table, A1 represents $EMIBF_4$, A2 represents IL-P14, A3 represents AS-110, A4 represents EMI-TFSI, B1 represents dimethyltetraglycol, B2 represents dimethyltriglycol, C1 represents polyethylene glycol monomethylether, C2 represents triethylene glycol monomethylether, and D1 represents polyethylene glycol 400.

Cations and anions included in A1 to A4 are as follows:

wherein R, R', and X are undisclosed.

TABLE 1

| | ionic liquids | | migration accelerators | | thickness of adhesive layer (μm) | adhesibility before voltage application (N/25 mm) | after voltage application | | rate of decrease (%) |
|---|---|---|---|---|---|---|---|---|---|
| | type | amt used (parts by wt) | type | amt used (parts by wt) | | | adhesibility (N/25 mm) | adhesive deposits | |
| Ex 1 | A1 | 10 | B1 | 10 | 40 | 35.3 | 3.8 | absent | 89 |
| Ex 2 | A1 | 10 | B1 | 10 | 80 | 37.8 | 3.6 | absent | 90 |
| Ex 3 | A2 | 10 | B1 | 10 | 40 | 32.0 | 5.5 | absent | 83 |
| Ex 4 | A3 | 10 | B1 | 10 | 40 | 30.4 | 0.8 | absent | 97 |

TABLE 1-continued

| | ionic liquids | | migration accelerators | | thickness of adhesive layer (μm) | adhesibility before voltage application (N/25 mm) | after voltage application | | rate of decrease (%) |
|---|---|---|---|---|---|---|---|---|---|
| | type | amt used (parts by wt) | type | amt used (parts by wt) | | | adhesibility (N/25 mm) | adhesive deposits | |
| Ex 5 | A4 | 10 | B1 | 10 | 40 | 29.5 | 1.1 | absent | 96 |
| Ex 6 | A4 | 20 | B1 | 20 | 40 | 34.3 | 0.6 | absent | 98 |
| Ex 7 | A4 | 20 | B1 | 20 | 80 | 37.1 | 0.7 | absent | 98 |
| Ex 8 | A4 | 20 | B2 | 20 | 40 | 32.3 | 0.6 | absent | 98 |
| Ex 9 | A3 | 5 | B1 | 10 | 40 | 29.2 | 5.6 | absent | 81 |
| Ex 10 | A3 | 10 | B1 | 30 | 40 | 36.2 | 0.5 | absent | 99 |
| Ex 11 | A4 | 10 | C1 | 10 | 40 | 39.7 | 2.6 | absent | 93 |
| Ex 12 | A4 | 5 | C1 | 10 | 40 | 38.6 | 3.2 | absent | 92 |
| Ex 13 | A4 | 10 | C1 | 30 | 40 | 32.9 | 1.4 | absent | 96 |
| Ex 14 | A4 | 10 | C2 | 10 | 40 | 30.6 | 1.9 | absent | 94 |
| Comp Ex 1 | A1 | 10 | — | — | 40 | 38.3 | 36.3 | present | 5 |
| Comp Ex 2 | A2 | 10 | — | — | 40 | 38.8 | 35.1 | present | 10 |
| Comp Ex 3 | A3 | 10 | — | — | 40 | 41.2 | 36.5 | present | 11 |
| Comp Ex 4 | A4 | 10 | — | — | 40 | 39.5 | 37.5 | present | 5 |
| Comp Ex 5 | A1 | 10 | D1 | 10 | 40 | 38.5 | 21.3 | present | 45 |
| Comp Ex 6 | A3 | 10 | D1 | 10 | 40 | 36.4 | 12.7 | present | 65 |
| Comp Ex 7 | A4 | 3 | B1 | 10 | 40 | 37.2 | 16.2 | present | 56 |
| Comp Ex 8 | A4 | 10 | B1 | 35 | 40 | 45.6 | 0.8 | present | 98 |
| Comp Ex 9 | A3 | 3 | B1 | 10 | 40 | 39.5 | 18.1 | present | 54 |

The term "amt" is an abbreviation for "amount".
The term "wt" is an abbreviation for "weight".
The term "Ex" is an abbreviation for "Example".
The term "Comp Ex" is an abbreviation for "Comparative Example".

The following can be understood from the results shown in Table 1.

Any of the adhesive products used in the above-described experiments are found to have the adhesibility of 25 N/25 mm or higher before the application of the voltage, and are found to have strong adhesion when used.

In view of Examples 1 to 5 and Comparative Examples 1 to 4, the ionic liquids and the migration accelerators, in the amounts described in Examples, do not leave any adhesive deposit after the application of the voltage, thus making it possible to obtain the adhesive products excellent in peelability.

In view of Examples 1, 2, 7, and 8, even though the electrically peelable adhesive layers are changed in thickness, the adhesive deposit is not left after the application of the voltage, thus making it possible to obtain the adhesive products excellent in peelability.

In view of Examples 1 and 3 to 5, if the ionic liquids described in the Embodiments are used, the adhesive deposit is not left after the application of the voltage, thus making it possible to obtain the adhesive products excellent in peelability.

In view of Examples 7, 8, 11, and 14 and Comparative Examples 5 and 6, the polyethylene glycol used as the migration accelerator leaves the adhesive deposit after the application of the voltage; however, the alkyl ether of the polyethylene glycol used as the migration accelerator does not leave any adhesive deposit after the application of the voltage, thus making it possible to obtain the adhesive products excellent in peelability.

In view of Examples 1 to 14 and Comparative Examples 7 to 9, the adhesive products containing 5 parts by weight or more to 30 parts by weight or less of the ionic liquid and of the migration accelerator with respect to 100 parts by weight of the acrylic polymer do not leave any adhesive deposit after the application of the voltage; therefore, such adhesive products are found to be excellent in peelability.

Evaluation of Time to Apply Voltage in Examples and Comparative Example

Four (4) evaluation samples were collected from each of the adhesive products of Examples 5 and 6 and Comparative Example 4; and a voltage of 10 V was applied to the evaluation samples for 3 sec, 5 sec, 7 sec, and 10 sec to measure adhesibility of the evaluation samples. The measurement of the adhesibility was carried out in the same manner as in Example 1; and average values thereby obtained were considered measured values. Table 2 shows results obtained.

TABLE 2

| | adhesibility (N/25 mm) | | | | |
|---|---|---|---|---|---|
| | before voltage application | time to apply voltage of 10 V | | | |
| | | 3 sec | 5 sec | 7 sec | 10 sec |
| Ex 5 | 29.3 | 15.7 | 12.6 | 3.8 | 1.2 |
| Ex 6 | 33.1 | 22.7 | 10.5 | 1.4 | 0.7 |
| Comp Ex 4 | 37.2 | 37.0 | 36.1 | 35.8 | 35.0 |

It is found from the results shown in Table 2 that the adhesibility of the adhesive products of the present invention is greatly reduced even though the voltage is applied for a short time.

Evaluation of Applied Voltage in Examples and Comparative Example

Four (4) evaluation samples were collected from each of the adhesive products of Examples 5 and 6 and Comparative Example 4; and voltages of 1.5 V, 3 V, 10 V, and 15 V were applied to the evaluation samples for 10 sec to measure adhesibility of the evaluation samples. The measurement of the adhesibility was carried out in the same manner as in Example 1; and average values thereby obtained were considered measured values. Table 3 shows results obtained.

TABLE 3

| | adhesibility (N/25 mm) | | | | |
|---|---|---|---|---|---|
| | before voltage application | voltage applied for 10 sec | | | |
| | | 1.5 V | 3 V | 10 V | 15 V |
| Ex 5 | 28.7 | 26.3 | 25.6 | 1.3 | 1.1 |
| Ex 6 | 34.1 | 31.8 | 29.9 | 0.6 | 0.5 |
| Comp Ex 4 | 36.5 | 36.8 | 36.4 | 35.2 | 33.3 |

It is found from the results shown in Table 3 that, unlike the adhesive product of Comparative Example, the adhesive products of the present invention are capable of reducing the adhesibility even though the low voltage, such as 10 V, is applied.

It is found from the above experimental results that the adhesive products can be obtained that are strong in adhesibility when used, are excellent in peelability even though the low voltage is applied, and do not leave much adhesive deposit after being peeled, by virtue of the adhesive composition contained in the adhesive products that comprises the acrylic polymer, the ionic liquid having the ionic conductivity of $10^{-4}$ S/cm or more to $10^{-2}$ S/cm or less, and the alkyl ether of the polyethylene glycol, and contains 5 parts by weight or more to 30 parts by weight or less of the ionic liquid and of the alkyl ether of the polyethylene glycol with respect to 100 parts by weight of the acrylic polymer.

REFERENCE SIGNS LIST 1 electrically peelable adhesive layer
2 base material or core material
3 conductive adherend
4 direct current power supply
5 conductive fixed object
6 non-conductive fixed object
7 optional adhesive or glue
8 conductive auxiliary material
9 non-conductive adherend

The invention claimed is:

1. An electrically peelable adhesive composition containing an acrylic polymer, an ionic liquid having an ionic conductivity of $10^{-4}$ S/cm or more to $10^{-2}$ S/cm or less, and an alkyl ether of a polyethylene glycol, wherein an amount of the ionic liquid and an amount of the alkyl ether of the polyethylene glycol each is 5 parts by weight or more to 30 parts by weight or less with respect to 100 parts by weight of the acrylic polymer, wherein the alkyl ether of the polyethylene glycol is mono alkyl ether of the polyethylene glycol or diakyl ether of triethylene glycol, wherein the mono alkyl ether of the polyethylene glycol is polyethylene glycol monomethylether having a weight-average molecular weight of 120 or more to 360 or less and the dialkyl ether of triethylene glycol has a weight-average molecular weight of 120 or more to 360 or less.

2. The composition according to claim 1, wherein the polyethylene glycol monomethylether has a weight-average molecular weight of 120 or more to 240 or less.

3. The composition according to claim 1, wherein the acrylic polymer contains copolymers including a residue derived from an alkyl (meth)acrylate monomer having an alkyl group with 1 to 8 carbon atoms, a carboxyl group-containing acrylic monomer, and/or a hydroxyl group-containing acrylic monomer.

4. The composition according to claim 1, wherein the ionic liquid is represented by the following formula (1):

(1)

wherein $R^1$ represents a bivalent hydrocarbon group with 2 to 8 carbon atoms that may contain a heteroatom, and forms a ring with $N^+$ in the formula;
$R^2$ and $R^3$ are the same or different and represent a hydrogen atom or an alkyl group with 1 to 6 carbon atoms (provided that when the nitrogen atom forms a double bond with an adjacent carbon atom, $R^3$ is not present); and
$X^-$ represents an anion selected from $Br$, $AlCl_4^-$, $Al_2Cl_7^-$, $NO_3^-$, $BF_4^-$, $PF_6^-$, $CH_3COO^-$, $CF_3COO''$, $CF_3SO_3^-$, $(CF_3SO_2)_2N^-$, $(FSO_2)_2N^-$, $(CF_3SO_2)_3C^-$, $AsF_6^-$, $SbF_6^-$, $F(HF)_n^-$, $CF_3(CF_2)_3SO_3^-$, $(CF_3CF_2SO_2)_2N^-$, and $CF_3CF_2COO^-$.

5. The composition according to claim 1, wherein the ionic liquid is salt containing a cation and an anion, the cation being selected from pyridinium-based cation, cyclic aliphatic ammonium cation, and imidazolium-based cation, and the anion being selected from $(FSO_2)_2N^-$, $(CF_3SO_2)_2N^-$, and $BF_4^-$.

6. The composition according to claim 1, wherein the composition that is adhered in direct contact with a conductive object and subjected to a voltage of 10 V for 10 seconds is peelable from the conductive object without leaving any adhesive deposit; and the conductive object is any of a conductive adherend, a conductive auxiliary material, a conductive base material, and a conductive fixed object.

7. An electrically peelable adhesive product including a base material and an electrically peelable adhesive layer formed in contact with the base material, wherein the electrically peelable adhesive layer contains the electrically peelable adhesive composition according to claim 1.

8. An electrically peelable adhesive product including a core material and two electrically peelable adhesive layers formed in contact with both surfaces of the core material, respectively, wherein the electrically peelable adhesive layers contain the electrically peelable adhesive composition according to claim 1.

9. The adhesive product according to claim 7, wherein the adhesive product is an adhesive tape or an adhesive sheet.

10. A method for peeling the electrically peelable adhesive product according to claim 7, the method comprising: adhering the adhesive product to a conductive object in such a way that the adhesive layer comes in contact with the conductive object; applying a voltage of 30 V or less to the adhesive layer through the conductive object; and peeling off the adhesive product from the conductive object to which the adhesive product is directly adhered, wherein the conductive object is any of a conductive adherend, a conductive auxiliary material, and a conductive fixed object.

11. The composition according to claim 1, wherein the dialkyl ether of triethylene glycol has a weight-average molecular weight of 120 or more to 240 or less.

12. The composition according to claim 1, wherein an adhesibility before voltage application of the electrically peelable adhesive composition is 25N/25 mm or more.

* * * * *

UNITED STATES PATENT AND TRADEMARK OFFICE
CERTIFICATE OF CORRECTION

PATENT NO. : 12,371,591 B2
APPLICATION NO. : 17/602212
DATED : July 29, 2025
INVENTOR(S) : Takahiro Aoki and Takashi Tomoda It is certified that error appears in the above-identified patent and that said Letters Patent is hereby corrected as shown below:

In the Claims

Claim 4, Column 22, Line 19, replace "Br" with "Br⁻"

Signed and Sealed this
Sixteenth Day of September, 2025

Coke Morgan Stewart
*Acting Director of the United States Patent and Trademark Office*